United States Patent
Hennebert

(10) Patent No.: US 12,212,661 B2
(45) Date of Patent: Jan. 28, 2025

(54) SELECTIVE DATA DISCLOSURE VIA A BLOCK CHAIN

(71) Applicant: COMMISSARIAT A L'ENERGIE ATOMIQUE ET AUX ENERGIES ALTERNATIVES, Paris (FR)

(72) Inventor: Christine Hennebert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 369 days.

(21) Appl. No.: 17/643,926

(22) Filed: Dec. 13, 2021

(65) Prior Publication Data

US 2022/0200792 A1   Jun. 23, 2022

(30) Foreign Application Priority Data

Dec. 14, 2020   (FR) .................................. 20 13204

(51) Int. Cl.
    *H04L 9/08*   (2006.01)
    *H04L 9/32*   (2006.01)

(52) U.S. Cl.
    CPC .......... *H04L 9/0825* (2013.01); *H04L 9/0836* (2013.01); *H04L 9/085* (2013.01); *H04L 9/3236* (2013.01); *H04L 9/3247* (2013.01)

(58) Field of Classification Search
    CPC ..... H04L 9/0825; H04L 9/0836; H04L 9/085; H04L 9/3236; H04L 9/3247; H04L 9/30; H04L 9/0861
    See application file for complete search history.

(56) References Cited

U.S. PATENT DOCUMENTS 10,554,421 B2 *  2/2020  Ra ........................... H04L 9/006
11,233,647 B1 *  1/2022  Fontaine ............... H04L 9/3215
(Continued)

OTHER PUBLICATIONS

Halpin, Harry; "Nym Credentials: Privacy-Preserving Decentralized Identity with Blockchains", 2020 Crypto Valley Conference on Blockchain Technology (CVCBT), IEEE, pp. 56-67 (Year: 2020).*

(Continued)

*Primary Examiner* — Matthew Smithers
(74) *Attorney, Agent, or Firm* — Oblon, McClelland, Maier & Neustadt, L.L.P.

(57) ABSTRACT

The present invention relates to a method for selective disclosure of confidential data of a first user to a second user of a blockchain (450). The first user is equipped with a deterministic hierarchical key portfolio (410) and selects a leaf of the tree of the portfolio as an emitter account. A secret key is derived from the chain code of this emitter account and the data to be disclosed are encrypted using this secret key. The first user transmits, by means of a first transaction, the data encrypted in this manner to a smart contract (430) which stores them in the blockchain. It transmits by means of a second transaction an access credit to the smart contract which stores it in connection with the pair formed by the emitter account of the first user and the receiver account of the second user. The second user transmits a third transaction to the smart contract from its receiver account (420). If the credit is not zero, the smart contract makes available to the receiver account the encrypted data stored in the blockchain in connection with the emitter account of the first user.

13 Claims, 4 Drawing Sheets

(56) References Cited

U.S. PATENT DOCUMENTS

| | | | | |
|---|---|---|---|---|
| 11,727,501 | B2* | 8/2023 | Wright | G06F 16/27 705/50 |
| 2017/0338967 | A1* | 11/2017 | Lewison | H04L 9/0643 |
| 2017/0372300 | A1* | 12/2017 | Dunlevy | G06Q 20/363 |
| 2018/0075453 | A1* | 3/2018 | Durvasula | G06Q 20/3678 |
| 2019/0279136 | A1* | 9/2019 | Gershenson | G06Q 10/10 |
| 2019/0333031 | A1* | 10/2019 | Kravitz | G06Q 20/06 |
| 2019/0347652 | A1* | 11/2019 | Johnson | G06Q 20/065 |
| 2020/0326973 | A1* | 10/2020 | Xie | G06F 16/2365 |
| 2020/0334668 | A1* | 10/2020 | Nicli | G06Q 20/3676 |
| 2020/0334674 | A1* | 10/2020 | Youngblood | G06Q 20/36 |
| 2020/0378399 | A1* | 12/2020 | Yamashita | F04D 29/563 |
| 2020/0380476 | A1* | 12/2020 | Trudeau | G06Q 20/0658 |
| 2021/0019737 | A1* | 1/2021 | Vladi | G06Q 20/02 |
| 2021/0326844 | A1* | 10/2021 | Zhou | G06Q 20/06 |
| 2021/0342836 | A1* | 11/2021 | Cella | H04L 9/3239 |
| 2021/0374693 | A1* | 12/2021 | La Salle | G06Q 20/0655 |
| 2022/0103369 | A1* | 3/2022 | Adams | H04L 9/3234 |
| 2022/0318399 | A1* | 10/2022 | Rodler | G06F 21/51 |
| 2022/0414259 | A1* | 12/2022 | Redniss | G06Q 30/0255 |
| 2023/0410965 | A1* | 12/2023 | Goldberg | G06F 21/6245 |

OTHER PUBLICATIONS

Krol et al.; "PASTRAMI: Privacy-preserving, Auditable, Scalable & Trustworthy Auctions for Multiple Items", 2020, ACM, pp. 296-310. (Year: 2020).*

Raikwar et al.; "SoK of Used Cryptography in Blockchain", 2019, IEEE, pp. 148550-148575. (Year: 2019).*

Zhou et al.; "A Blockchian-based Access Control Framework for Secured Data Sharing in Industrial Internet", 2020, IEEE, pp. 231-236. (Year: 2020).*

Shi et al.; A Mechanism to Resolve the Unauthorized Access Vulnerabilty Caused by Permission Delegation in Blockchain-Based Access Control, 2020, IEEE, pp. 156027-156042. (Year: 2020).*

French Preliminary Search Report issued Aug. 27, 2021 in French Application 20 13204 filed on Dec. 14, 2020 , 2 pages (with English Translation of Categories of Cited Documents).

Rahman et al., "Protecting Personal Data Using Smart Contracts", Internet and Distributed Computing Systems, IDCS 2019, vol. 11874, 2019, 12 pages.

Steichen et al., "Blockchain-Based, Decentralized Access Control for IPFS", 2018 IEEE Confs on Internet of Things, Green Computing and Communications, Cyber, Physical and Social Computing, Smart Data, Blockchain , Computer and Information Technology, Congress on Cybermatics, IEEE, 2018, 8 pages.

Aleksa et al., "Storing and passing encrypted data to another owner", Ethereum Stack Exchange, 2018, 4 pages, URL: https://ethereum.stackexchange.com/questions/31355/storing-and-passing-encryped-data-to-another-owner.

Antonopoulos et al., "Mastering Ethereum: Building Smart Contracts and DApps", Chapter 5: Wallets, 2018, pp. 79-97.

* cited by examiner

SELECTIVE DATA DISCLOSURE VIA A BLOCK CHAIN

TECHNICAL FIELD

The present invention relates to the general field of blockchains (blockchains) and more particularly that of deterministic hierarchical portfolios of secret keys allowing emitting transactions towards a blockchain.

PRIOR ART

The generation of a secure channel between remote devices, also called later on "pairs", supposes sharing a secret key between these devices. This sharing could be achieved by manual distribution of the keys, before any communication on the channel, or by means of a Diffie-Hellmann type key exchange protocol using an asymmetric cryptosystem.

It should be reminded that in a Diffie-Hellman type key exchange protocol (hereinafter referred to as D-H), each remote device is provided with a pair of asymmetric keys (private key, public key). The private key of an emitter device is kept secret by the latter and in particular is never disclosed to the receiver device. It is used to encrypt or sign messages and to identify the emitter device. However, the public key is known to the receiver device and is used to decrypt messages and to check the signature of the emitter device. The purpose of the key exchange protocol is to enable each remote device to independently compute the same secret key that will be used to establish a secure channel between them, starting from public elements of a cryptosystem exchanged on a non-secure channel.

A major limitation of the aforementioned key exchange protocol is that it is not immune against a Man-In-the-Middle type attack. Nonetheless, it is known to overcome this type of attacks to identify the emitter of each public key by means of a signature by a trusted third party (digital certificate in the X.509 format for example).

In order to avoid resorting to a trusted third party, and in particular to a centralised certification authority, it has been proposed in the patent application FR-A-3076420 to use a blockchain, adapted to store smart contracts (of the Ethereum type) in a distributed register (ledger). The D-H type exchange of keys between pairs, is then carried out by means of a smart contract before which the pairs have been declared beforehand. Afterwards, the two pairs could communicate confidentially by means of a secure channel with the shared secret key, computed from the exchanged keys.

Nonetheless, the generation of the shared secret key does not exempt the pairs from a D-H type key exchange, even though the latter is intermediated by the smart contract. Furthermore, when a user of the blockchain wishes to selectively exchange with a plurality of pairs, he must have as many keys as pairs, compute and store the keys generated by the D-H protocol, which is generally unsuited for an embedded environment (in particular for IoT nodes) because of the low memory and computing resources of the connected objects. Furthermore, the permanent storage of keys in a key portfolio is detrimental to security. Finally, while this method for generating a shared secret key between pars is well suited for a confidential communication on an auxiliary channel, it is much less suited when it is intended to selectively disclose confidential information to a third party by storing them in the distributed register itself.

Consequently, an object of the present invention is to enable a selective disclosure of information between pairs via a blockchain which does not require a complex protocol for exchanging cryptographic elements or a permanent storage of keys.

DISCLOSURE OF THE INVENTION

The present invention is defined by a method for selective disclosure of data by a first user of a blockchain to a second user of this blockchain, the first user being equipped with a deterministic hierarchical key portfolio organised according to a tree structure from a master key, characterised in that:

a) the first user selects a leaf of the tree structure as an emitter account, said leaf being identified by a path in the tree, the emitter account being associated to a private key, $k_{leaf}$, a corresponding public key, $PK_{leaf}$, an emitter account address, $add_{leaf}$, obtained by hashing of the public key and a chain code, $CCK_{leaf}$;

b) the first user encrypts said data by means of a secret key obtained from the chain code, $CCK_{leaf}$;

c) the first user transmits a first transaction from his emitter account address $add_{leaf}$ to a smart contract deployed on the blockchain, the first transaction having as an argument the data encrypted in this manner as well as a call to a first function of the smart contract;

d) the first function of the smart contract stores in the blockchain the data encrypted in this manner in connection with the emitter account address of the first user, $add_{leaf}$;

e) the first user transmits to said smart contract, a second transaction from its emitter account address, $add_{leaf}$, the second transaction having as an argument the account address of the second user, an access token, as well as a call to a second function of the smart contract;

f) the second function of the smart contract stores in the blockchain the access credit in connection with the pair formed by the emitter account address of the first user and the receiver account address of the second user;

g) the second user transmits to said smart contract, a third transaction, from his receiver account address, the third transaction having as an argument the address of the emitter account of the first user as well as a call to a third function of the smart contract;

h) the third function of the smart contract checks up that the access token stored in connection with the pair formed by the emitter account address of the first user and the receiver account address of the second user is valid and, in this case, returns to the receiver account address of the second user, the encrypted data stored in connection with the emitter account address of the first user, $add_{leaf}$.

Furthermore, the first user can transmit to the second user the address of the emitter account, $add_{leaf}$. This secret key could be transmitted to the second user via a secure auxiliary channel, for example an NFC communication or an ultrasonic communication.

The secret key may be identical to the chain code, $CCK_{leaf}$.

After step (h), the second user could decrypt the encrypted data with the secret key received via the secure auxiliary channel.

At step (c), the first user signs the first transaction with the private key $k_{leaf}$ and at step (d), the first function of the smart contract checks up using this signature whether the first transaction has actually been emitted by the emitter account address of the first user, $add_{leaf}$, the encrypted data being store in the blockchain only if this check-up is positive.

Similarly, at step (e), the first user signs the second transaction with the private key $k_{leaf}$ and at step (f), the second function of the smart contract checks up using this signature whether the second transaction has actually been emitted by the emitter account address of the first user, $add_{leaf}$, the access token being stored in the blockchain only if this check-up is positive.

Finally, at step (g), the second user signs the third transaction with the private key associated to his receiver account and that at step (h), the third function of the smart contract checks up using this signature whether the third transaction has actually been emitted by the receiver account address of the second user, the encrypted data being made available to this address only if this check-up is positive.

At step (h) the access token is invalidated by the third function of the smart contract after the encrypted data have been transmitted to the receiver account address of the second user.

Advantageously, at step (c), the first transaction further comprises said path in the tree as an argument and the latter is stored in the blockchain by the smart contract.

At step (e), the second transaction further includes an index as an argument, the access token being stored at step (f) in connection with the pair of the emitter account of the first user and the receiver account of the second user, on the one hand, and of said index, on the other hand.

At step (h), the third function of the smart contract checks up that the access token stored in connection, on the one hand, with the pair formed by the emitter account address of the first user and the receiver account address of the second user, and on the other hand, with said index, is valid, said third function making available to the address of the receiver account of the second user, the encrypted data stored in connection with the emitter account address of the first user, $add_{leaf}$, and said index.

BRIEF DESCRIPTION OF THE DRAWINGS

Other features and advantages of the invention will appear upon reading a preferred embodiment of the invention, described with reference to the appended figures wherein.

DETAILED DISCLOSURE OF PARTICULAR EMBODIMENTS

The idea at the origin of the present invention consists in taking advantage of the construction of a deterministic hierarchical key portfolio and more particularly of the chain code associated to a leaf of the key tree to generate an encryption key.

It should be reminded that the users of a blockchain can emit transactions from their respective accounts (according to the Ethereum terminology) or from their respective addresses (according to the Bitcoin terminology).

Each account of a user is associated to a public key-private key pair of an asymmetric cryptosystem, in general a cryptosystem on an elliptic curve, the identifier of the account being obtained by hashing of the considered public key. The private key is known to the user alone.

When the user wishes to transmit a transaction to the blockchain from one of his accounts, he signs it with his private key, for example by means of the ECDSA (Elliptic Curve Digital Signature Algorithm) algorithm. Being provided with the public key, each could then check that the transaction has actually been signed by the holder of the account from which the signed transaction is emitted.

As a general rule, a user has a plurality of accounts, each account being associated in a unique manner to a private key-public key pair. Consequently, a user is provided with a set of private keys, also called key portfolio or more simply portfolio.

Conventionally, a distinction is made by non-deterministic (or random) portfolios and deterministic portfolios.

In a non-deterministic portfolio, also known under the acronym JBOK (Just a Bunch of Keys), the keys are randomly generated. This portfolio type is not structured and its management is therefore complex. Furthermore, the maintenance of the portfolio implies performing relatively heavy backup operations.

To overcome these difficulties, deterministic hierarchical portfolios are generally used in which all of the private keys are generated, in a tree-like manner, from the same seed. In other words, the knowledge of the seed allows finding all of the private keys of the portfolio.

Figure 1:
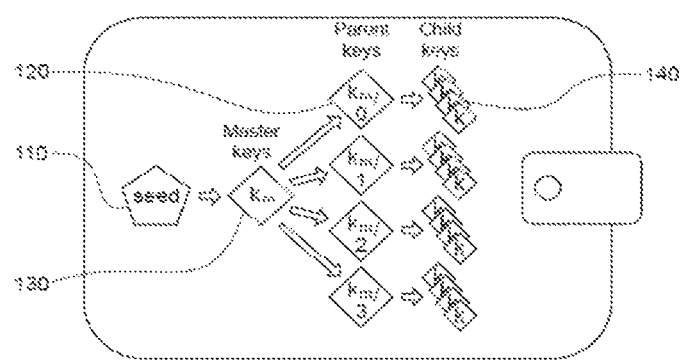
FIG. 1, already described, schematically represents the structure of a deterministic hierarchical type key portfolio.

FIG. 1 schematically represents the structure of such a deterministic hierarchical portfolio.

The seed, 110, at the origin of the key portfolio is a random number (or entropy), for example over 128 or 256 bits. In general, it is represented by a mnemonic code formed by 12 or 24 words derived from a predetermined dictionary including a predetermined number of words (2048).

The seed is then hashed (for example by means of the hashing function HMAC-SHA 512), to provide on the one hand a master private key, 120, ($k_m$) and an associated chain code (not represented).

Afterwards, the master public key is computed from the master private key by means of $PK_m = k_m \cdot G$ where G is the generating point of the elliptic curve.

At each generation, we obtain from a parent private key, 130, the chain code associated to this key and an index number, i, a child private key, 140, with a birth order i+1 (the first child corresponding to the zero index). The generation of the private key may involve a hashing function (or a combination of hashing functions) preventing from tracing a parent private key from the private key of a child.

The generation of the private keys in a deterministic hierarchical portfolio may be carried out according to different methods.

Figure 2A:
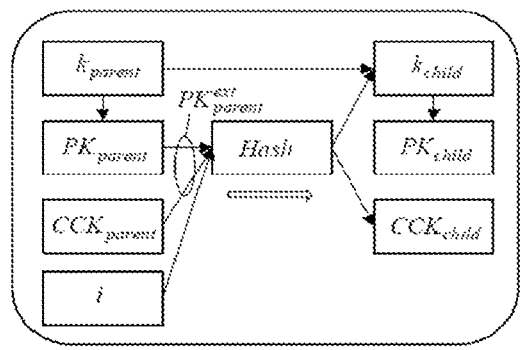
FIGS. 2A and 2B schematically illustrate a first and a second known method for generating private keys in a deterministic hierarchical type key portfolio.

FIG. 2A represents a first method for generating private keys in a deterministic hierarchical portfolio.

The elements relating to a parent private key have been represented to the left of the figures and those relating to a child private key, derived from this parent private key, to the right.

First of all, the parent private key, $k_{parent}$, allows generating the corresponding public key of the asymmetrical cryptosystem, for example $PK_{parent} = k_{parent} G$ in the case of a cryptosystem on an elliptic curve.

The parent public key $PK_{parent}$ is concatenated to the associated chain code, $CCK_{parent}$, to form an extended public key $PK_{parent}^{ext} = PK_{parent} | CCK_{parent}$. This extended public key is combined with the index, i, of the child key that we wish to generate, and then the whole is hashed by means of a hashing function, Hash.

The result of the hashing is split into a left portion and a right portion. The left portion is combined with the parent private key, $k_{parent}$, to give the child private key, $k_{child}$, whereas the right portion gives the chain code associated to the child key, namely $CCK_{child}$. The child private key, $k_{child}$, allows generating the child public key, $PK_{child} = k_{child}G$.

Consequently, we have elements $k_{child}$, $PK_{child}$, $CCK_{child}$ allowing iterating the generation of private keys once again.

The generation operation allowing switching from a parent private key into a child key with an index i is herein denoted $CKD_{priv}^n$. In other words:

$$k_{child} = CKD_{priv}^n(k_{parent}, i) \quad (1)$$

and therefore, by recurrence:

$$k_{child} = CKD_{priv}^n( \ldots CKD_{priv}^n(CKD_{priv}^n(k_m, i_1), i_2)), \ldots, i_N) \quad (2)$$

where N is the length of the path in the tree starting from the seed, and where $i_1, \ldots, i_N$ is the sequence of indexes of the child keys along the path.

Figure 2B:
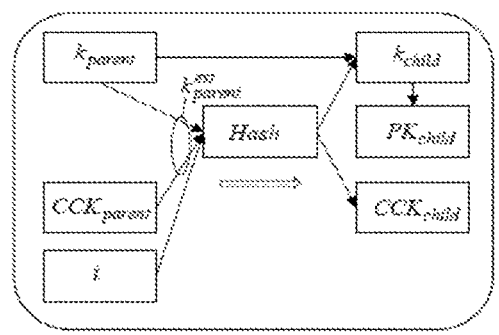

FIG. 2B represents a second method for generating private keys in a deterministic hierarchical portfolio.

In contrast with the previous so-called normal method, this so-called hardened (hardened) generation method uses an extended private key instead of an extended public key to generate a private key of the next generation. A priori, it is more robust than the normal method since it does not involve the computation of public information.

Like before, the elements relating to a parent private key are represented to the left and those relating to a child private key, derived from this parent private key, to the right.

The parent private key, $k_{parent}$, is concatenated with the associated chain code to form an extended private key $k_{parent}^{ext} = k_{parent} | CCK_{parent}$.

This extended private key is combined with the index, i, of the child key that we wish to generate, then the whole is hashed by means of a hashing function, Hash.

The result of hashing is split into a left-side portion and a right-side portion. The left-side portion is combined like before with the parent private key, $k_{parent}$, to give the child private key, $k_{child}$ whereas the right-side portion gives the chain code associated to the child key, namely $CCK_{child}$. In turn, the child private key, $k_{child}$, allows generating the child public key, $PK_{child} = k_{child}G$.

The generation operation allowing switching from a parent private key into a child key with the index i is called hardened generation operation and denoted $CKD_{priv}^h$. In other words:

$$k_{child} = CKD_{priv}^h(k_{parent}, i) \quad (3)$$

If only hardened generation operations are used, we obtain by recurrence:

$$k_{child} = CKD_{priv}^h( \ldots CKD_{priv}^h(CKD_{priv}^h(k_m, i_1), i_2)), \ldots, i_N) \quad (4)$$

where, like before N is the length of the path in the tree starting from the seed, and where $i_1, \ldots, i_N$ is the sequence of indexes of the child keys along the path.

It should be noted that the generation of a private key of the portfolio could successively involve normal generation operations and hardened generation operations along the path. Thus, more generally, this private key will be obtained by:

$$k_{child} = CKD_{priv}( \ldots CKD_{priv}(CKD_{priv}(k_m, i_1), i_2)), \ldots, i_N) \quad (5)$$

where each elementary generation operation $CKD_{priv}$ could be a normal generation operation $CKD_{priv}^n$ or a hardened generation operation $CKD_{priv}^h$.

In practice, the indexes i used in the normal generation operations and the hardened generation operations take on their values in distinct intervals. Thus, the indexes ranging from 0 to $2^{31}-1$ are used to generate private keys according to a normal generation operation and the indexes ranging from $2^{31}$ to $2^{32}-1$ are used to generate private keys according to a hardened generation operation.

In any case, a private key may be identified by means of a path in the tree starting from the master key. Thus, for example, $k_m/0/3$ will designate the second generation private key, $4^{th}$ normal child of the parent key, itself first normal child of the master private key. Similarly, $k_m/0/3'$ will designate the second generation private key, $4^{th}$ hardened child of the parent key, itself first normal child of the master private key, where we conventionally consider $i' = i + 2^{31}$.

Deterministic hierarchical portfolios have been the subject of a standardisation in the documents BIP-32 and BIP-44. A detailed description of deterministic hierarchical portfolios could be found in the work of A. M. Antonopoulos and G. Wood entitled "Mastering Ethereum" published by O'Reilly in December 2018, pp. 79-97.

Deterministic hierarchical portfolios may be stored in physical devices, generally mobile personal devices, for examples dongles. Thus, when a user wishes to sign a transaction using one of his private keys, he authenticates himself to his personal device by means of a PIN code (or password) to unlock his portfolio, then selects in the portfolio the account from which he wishes to emit the transaction and finally signs the transaction with the private key attached to this account by performing a physical action, for example by pressing on a button of the considered personal device.

The structure of the deterministic hierarchical portfolios has been standardised for an episodic emission of transactions based on cryptocurrencies. The structure of a path in the tree of the portfolio thus complies with a format suited for this application case, defined in the document BIP-44 by:

m/purpose'/coin_type'/account'/change/address_index where the field "m" relates to the master key, the field "purpose" relates to the considered standard (herein the value 44 for BIP-44), the field "coin_type" specifies the used cryptocurrency, the field "account" specifies an account from which the user could divide his portfolio into sub-accounts, the field "change" allows distinguishing receiving addresses (receiving addresses) and change addresses (change addresses) when the blockchain allows so (this is in particular the case in Bitcoin but not in Ethereum), and finally the field "address_index" enables a user to distinguish his different accounts for the same cryptocurrency.

Next, we will consider a deterministic hierarchical key portfolio (HD) according to the previous meaning, in particular a portfolio in accordance with the standards BIP-32 and BIP-44. Such a portfolio has a tree structure wherein a private key, associated to a node v of the tree, is generated by means of a hashing function from the extended public or private key associated to the parent node of v and with the index, i, giving the birth order of the key as described in connection with FIGS. 2A and 2B.

Figure 3:
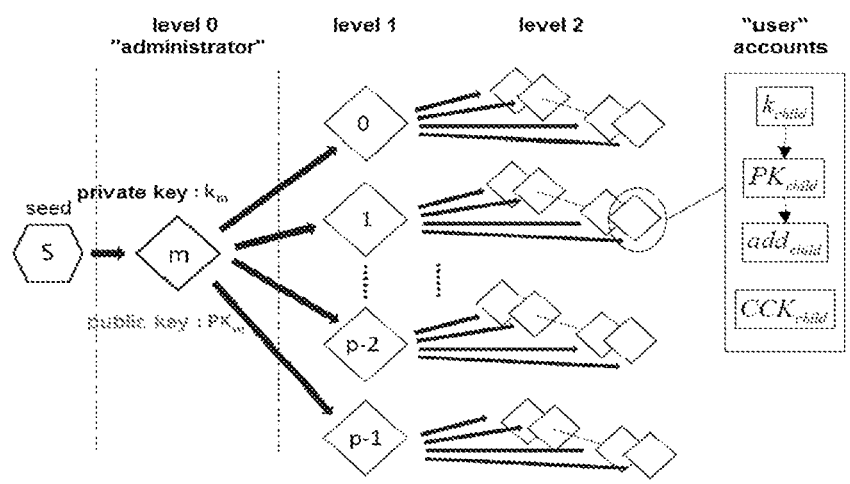
FIG. 3 schematically represents the cryptographic elements of a leaf account of a deterministic hierarchical type key portfolio.

FIG. 3 schematically represents the structure of a key portfolio HD used in the context of the present invention.

The "0" level of the tree structure, or root, corresponds to a master private key, $k_m$, obtained from hashing of a random seed (or entropy), advantageously encoded in the form of a mnemonic code. Hashing could be carried out by a hashing function and possibly a combination of such functions. The result of hashing provides, on the one hand, the master private key and, on the other hand, a chain code, $CCK_m$, associated to this same key. The master public key, $PK_m$, is obtained from the master private key by means of an asymmetric cryptography algorithm (for example $PK_m = k_m \cdot G$ for a cryptography algorithm on an elliptic curve).

At the "0" level of the tree structure, an administrator account is created, access to which is protected by an administrator authentication element (PIN code or administrator password).

The administrator account is associated to the master private key, $k_m$, as well as to the corresponding master public key, $PK_m = k_m \cdot G$, and is identified by an identifier of the administrator account ($login_{adm}$) and/or a PIN code or password.

Starting from the master key, p 1-order child keys, denoted $k_m|0$, $k_m|1$, $k_m|2$, ... $k_m|p-1$ according to the convention indicated before, could be created (herein according to a normal generation), each of these keys could, in turn, allow generating 2-order child keys, etc.

Considering now an account associated to a leaf of the tree of the portfolio HD, indexed by an index path $i_1, \ldots i_N$ in the portfolio and denoting $k_{leaf}$ the corresponding private key which has been generated by means of the iterative process given by the expression (5), the public key associated to this account is obtained, in the case of a cryptosystem on an elliptic curve, by $PK_{leaf} = k_{leaf} \cdot G$ and the address of the account is none other than $add_{leaf} = Hash(PK_{leaf})$ where Hash is a hashing function or a combination of hashing functions. For example, it is possible to take on the function keccack256 as a hashing function for the obtainment of an Ethereum account address and the combination of the functions sha256 and ripemed160 for the obtainment of a Bitcoin account address, in a manner known per se.

Figure 4:
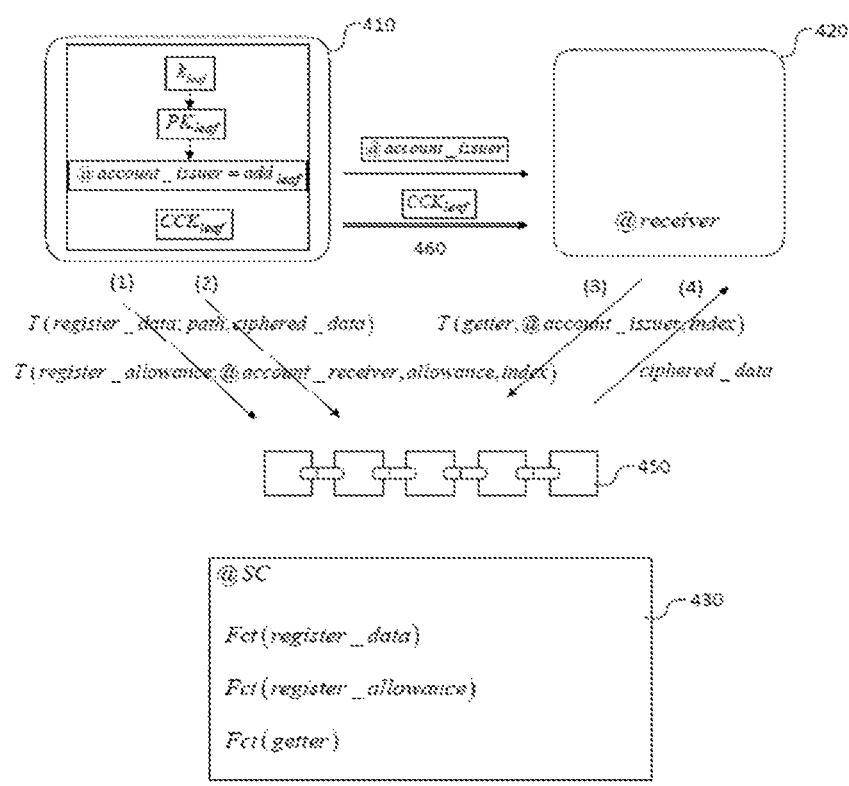
FIG. 4 represents the exchanges taking place in the selective disclosure method between users of a blockchain, according to an embodiment of the present invention.

FIG. 4 represents the exchanges taking place in the selective disclosure method between users of a blockchain, according to an embodiment of the present invention.

The key portfolio of a first user of a blockchain, 450, wishing to disclose private information (for example personal information) to a second user, 420, is represented in 410.

We suppose that the key portfolio 410 is of the deterministic hierarchical type as described before, the keys of the tree having been generated from the normal generation operations and/or from the hardened generation operations.

The reference numbers of FIG. 3 have been kept, in other words $k_{leaf}$ is a private key associated to a leaf of the tree, $PK_{leaf} = k_{leaf} \cdot G$ is the corresponding public key, and $add_{leaf} = Hash(PK_{leaf})$ is the address of the account associated to the considered public key. Moreover, the chain code generated from hashing of the extended public key (or of the extended private key in the case of a hardened generation operation) of the parent node of this leaf is denoted $CCK_{leaf}$.

When the first user wishes to selectively disclose data, data, from his user account with the address $add_{leaf}$, he encrypts them by means of a symmetric encryption algorithm (AES, DES, Triple DES for example) using $CCK_{leaf}$ as the secret key.

He transmits these data encrypted in this manner, ciphered_data to a smart contract (smart contract), 430, deployed beforehand on the blockchain.

More specifically, in a first step, he sends to the address @SC of this smart contract, a first transaction from his public address or EOA (Externally Owned Account), account_issuer=$add_{leaf}$ and signs it by means of his private key $k_{leaf}$.

Upon reception, the smart contract SC checks from the signature whether the transaction has actually been emitted by the public address EOA. More specifically, the smart contract could deduce components of the signature and of the account address of the emitter having emitted the transaction, if the later has actually been signed by the specific private key. Thus, the smart contract authenticates the emitter.

After having authenticated the emitter and having been ensured that the different input arguments actually meet the conditions specified in the contract, the smart contract executes the called function (also called method).

A transaction emitted by the emitter account address of the user may be in the following general form:

```
Transaction: {
  'from': @account_issuer
  'to': @smart_contract_address
  'data': IDmethod & arguments
}
signée par private_key_issuer
``` wherein:
@account_issuer represents the account address of the emitter (EOA) from which the transaction is emitted. This public address is obtained by hashing of the public key corresponding to the specific private key, as explained hereinabove;
@smart_contract_address represents the address of the smart contract deployed on the blockchain;
IDmethod & arguments respectively represent the function (the method) of the smart contract called by the transaction and the input arguments;
private_key_issuer designates the specific private key.

The first transaction has been represented in FIG. 4 by:

$$T(register\_data; path, ciphered\_data) \qquad (6)$$

wherein the address of the emitter account (account_issuer) and the address of the smart contract have been omitted for simplicity. The parameter register_data is the name of the method called by the transaction in the smart contract, the data ciphered_data represent the encrypted data and the parameter path indicates a path of the tree (for example $k_m/0/3$) allowing identifying and rebuilding the encryption key of these data.

An example of a first transaction is given hereinafter:

```
transaction_issuer {
  from: account_issuer
  to: smart_contract_address
  data: serialize {
    method (4 bytes) register_data
```

```
    path registration
    data ciphered using "chaincode" key with a symmetric ciphering function
    }
}
```

Different first transactions may be emitted from different accounts of the same user. The structure of a record of encrypted data in the distributed register may be represented by a table matching encrypted data to each account of the user. Where appropriate, different encrypted data associated to the same account may be stored in the distributed register at an indexed memory address, the index being incremented at each new record, for example:

TABLE I

| account_issuer | Index | ciphered data |
|---|---|---|
| 0x1fe4...34a9 | 3 | 0x35a85ec1a0...3b4e2aff |
| 0x1fe4...34a9 | 17 | 0xb5e280ad3f...a4c67fb5 |
| 0x48cf...b21e | 11 | 0xc43a9dc50e...b62a3ec9 |

It arises from the Table I (first two rows) that encrypted information is stored for the same user account under different indexes. Furthermore, the user can use different accounts from his key portfolio HD to store encrypted information corresponding to different or identical cleartext data (broadcast mode). It should be understood that encrypted data originating from two different accounts are encrypted with different keys and are consequently different even though the cleartext data are identical.

It is essential to note that the parameter path could advantageously be stored in the blockchain by the smart contract. Thus, the first user does not have to store the chain code $CCK_{leaf}$ in the key portfolio, he could rebuild this secret key dynamically where needed from the path, after having read the parameter path in the blockchain (for example by means of a call of a function getter in the smart contract).

In a second step, the first user sends a second transaction to the address @SC from his public address account_issuer and signs it like the first one by means of his private key $k_{leaf}$. The smart contract SC checks, like before, from the signature whether the transaction has actually been emitted by the public address account_issuer.

The second transaction has been represented in FIG. 4 by:

$$T(register\_allowance;@account\_receiver,allowance, index) \quad (7)$$

wherein the address of the emitter account (account_issuer) and the address of the smart contract, @SC, have, herein again, been omitted for simplicity. The parameter register_allowance is the name of the method called by the transaction in the smart contract, @account_receiver designates the account of the receiver, allowance is an access token (for example according to the convention of the ERC-20 token) and index indicates the memory location where the encrypted data are stored in the distributed register.

This second transaction allows recording an access right (represented by the access token allowance) to the benefit of a receiver user, identified by his user account @account_receiver. An example of a second transaction is given hereinafter:

```
transaction_issuer {
    from: account_issuer
    to: smart_contract_address
    data: serialize {
        method (4 bytes) register_allowance
        account_receiver
        allowance
        index authorized data
    }
}
```

Different accounts of an emitter user could grant access rights to the same receiver user account to access encrypted data stored at memory locations with different indexes, for example:

TABLE II

| account_issuer | account_receiver | Allowance | Index |
|---|---|---|---|
| 0x1fe4...34a9 | 0x4f10...a749 | 1 | 17 |
| 0x1fe4...34a9 | 0x48cf...b21e | 1 | 3 |
| 0x48cf...b21e | 0xc5ab...0749 | 1 | 11 |

In this example, the emitter account 0x1fe4 . . . 34a9 authorises the receiver account 0x4f10 . . . a749 to access the encrypted data recorded under the index 17 once; the emitter account 0x1fe4 . . . 34a9 authorises the receiver account 0x48cf . . . b21e to access the encrypted data recorded under the index 3 once; the emitter account 0x48cf . . . b21e authorises the receiver account 0xc5ab . . . 0749 to access the encrypted data recorded under the index 11 once.

When the access rights have been recorded in the blockchain, the receiver user can access the encrypted data by sending, from his public address account_receiver, a third transaction to the address of the smart contract, @SC. The receiver signs this transaction by means of his private key and the smart contract SC checks from the signature whether the transaction has actually been emitted by the public address account_receiver.

The third transaction has been represented in FIG. 4 by:

$$T(getter;@account\_issuer,index) \quad (8)$$

wherein the address of the receiver account (account_receiver) and the address of the smart contract, @SC, have been omitted for simplicity. The parameter getter is the name of the method called by the third transaction in the smart contract, and @account_issuer has the same meaning as before, i.e. designates the account of the user having stored encrypted confidential data for him. The method getter checks whether the account @account_issuer has actually provided the token representing the access right allowance for the receiver enabling him access to the encrypted data, stored under the index corresponding to this token. If successful, the access right is spent and the method getter returns the encrypted data to the receiver user, 420. The use of an access tight then leads to an expiry of the access token "allowance".

For example, in the example given in the Table II, after the receiver user account 0xc5ab . . . 0749 has accessed the encrypted data of the emitter user account 0x48cf . . . b21e stored under the index 11, the access token allowance is reset to zero and, consequently, a new access to these encrypted data is prohibited.

The third transaction enables the receiver user to recover the confidential data stored for him by the emitter user. An example of a third transaction is given hereinafter:

```
transaction_receiver {
    from: account_receiver
    to: smart_contract_address
    data: serialize {
        method (4 bytes) getter
        account_issuer
        index
    }
}
```

Afterwards, the receiver user can decrypt the data received from the smart contract by means of a secret key $CCK_{leaf}$.

In order to be able to interact with the blockchain and recover the encrypted data, the receiver user must have received beforehand the public address, @account_issuer, of the user account of the emitter.

For example, in the case of a face-to-face operation, the emitter could present to the receiver a QR code representing the address @account_issuer of this user account and the receiver will obtain this address by scanning this QR code in a manner known per se. In the case of a remote operation, the receiver could obtain this address by transmission via a secure channel or not, or else by consulting a database.

Furthermore, to decrypt the data received from the smart contract, the receiver must have the secret key, $CCK_{leaf}$. The latter could be transmitted by the emitter to the receiver by means of a secure auxiliary channel, 460, for example a short-range communication channel such that a NFC communication channel or an ultrasonic communication channel.

Figure 5:
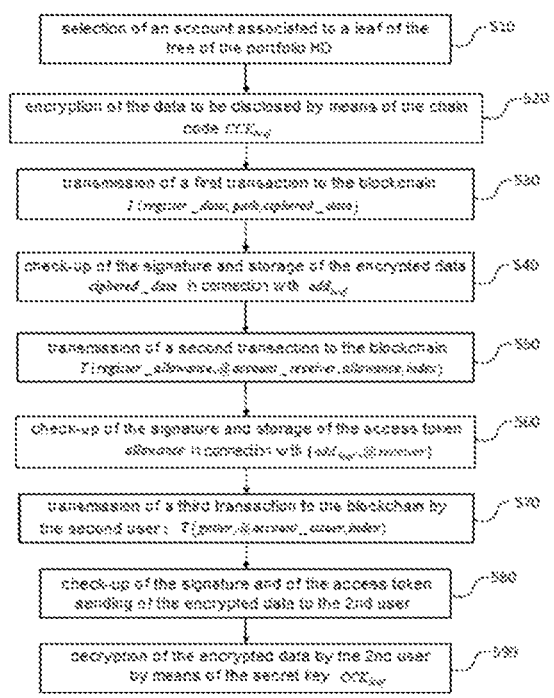
FIG. 5 represents the flowchart of a method for selective disclosure of information between users of a blockchain, according to an embodiment of the present invention.

FIG. 5 represents the flowchart of a method for selective disclosure of information between users of a blockchain, according to an embodiment of the present invention.

In a first step, 510, the first user, provided with a key portfolio HD selects a leaf of the tree as an emitter account. To this user account are associated, a private key $k_{leaf}$, an account address, $add_{leaf}$, obtained by hashing off the public key, $PK_{leaf}$, as well as a chain code, $CCK_{leaf}$.

At step 520, the first user encrypts the data that he wishes to selectively disclose to the second user, by means of a symmetric encryption algorithm, using as a secret key the chain code $CCK_{leaf}$.

At step 530, the first user transmits to the blockchain a first transaction, $T_1$, from his account address $add_{leaf}$ to the address of a smart contract deployed on the blockchain, @SC, the transaction $T_1$ having as arguments the data encrypted beforehand, @SC, as well as the call to a first function of the smart contract, register_data. This transaction further includes as arguments the path of the tree allowing identifying and rebuilding the encryption key. The transaction $T_1$ is signed using the private key $k_{leaf}$ of the user account.

At step 540, the first function of the smart contract checks using this signature that the transaction $T_1$ has actually been emitted by the account address $add_{leaf}$ and, if so is the case, the first function of the contract stores in the blockchain the encrypted data, ciphered_data in connection with the address $add_{leaf}$. When an index (index) is present, the encrypted data are also stored in connection with this index.

At step 550, the first user transmits to the blockchain a second transaction, $T_2$, from his account address $add_{leaf}$ to the address of the smart contract, the transaction $T_2$ having as arguments, the account address of the second user, @receiver, an access token (representing an access right), @receiver, as well as the call to a second function of the smart contract, register_allowance. Optionally, the transaction $T_2$ may include the index indicating the memory location of the data in the distributed register (ledger) as an additional argument. The transaction $T_2$ is signed using the private key $k_{leaf}$ of the user account.

At step 560, the second function of the smart contract checks using this signature that the transaction $T_2$, has actually been emitted by the account address $add_{leaf}$ and, if so is the case, the second function of the contract stores in the blockchain the access token, allowance, in connection with the pair formed by the address of the emitter account and the address of the receiver account, ($add_{leaf}$, @receiver). When an index is present, the access token is also stored in connection with this index.

At step 570, the second user transmits to the blockchain a third transaction, $T_3$, from his account address @receiver, to the address of the smart contract @receiver. This transaction comprises as arguments the address of the emitter account of the first user, $add_{leaf}$, which would have been transmitted beforehand to the second user by the first user, as well as, where appropriate, the index of the data that is authorise to be read in the distributed register as well as the call to a third function of the smart contract, getter. The second user signs this transaction using his private key associated to his account address @receiver.

At step 580, the third function of the smart contract checks using this signature that the transaction $T_3$ has actually been emitted by the account address @receiver and that the access credit, allowance, stored in connection with the pair ($add_{leaf}$, @receiver) is not zero. When these two conditions are met, the smart contract returns to this address, the encrypted data ciphered_data stored in connection with the address $add_{leaf}$ and, where appropriate, the value of the index. The access token allowance is then invalidated, in other words the access credit is then reset to zero, so that a new attempt of the second user to access the encrypted data will be unsuccessful.

Finally, at step 590, the second user decrypts the encrypted data ciphered_data by means of the secret key, $CCK_{leaf}$, after having received it from the first user via a secure channel.

In the embodiment described in connection with FIGS. 4 and 5, the secret key is directly given by the chain code $CCK_{leaf}$ provided by a leaf of the tree of the portfolio HD. More generally, the secret key could be obtained by means of an operation on this chain code. Thus, according to one variant, the secret key could result from an operation of contextualisation of this chain code. For example, a context index (geography, of use or related to the receiver for example) could be concatenated to $CCK_{leaf}$ and the concatenated set could be hashed to provide the secret key.

A person skilled in the art should understand that the method for selective disclosure of data between the two users does not require any complex exchange protocol between them, the transfer of these data being secure and intermediated by a smart contract deployed on the blockchain. Even though the second user could fraudulently obtain the secret key, he would not obtain the encrypted data if no access credit has been allocated to him by the first user. Furthermore, the first user does not need to compute, store and maintain secret keys in addition to his key portfolio HD.

The invention claimed is:

1. A method for selective disclosure of data by a first user of a blockchain to a second user of this blockchain, the first user being equipped with a deterministic hierarchical key portfolio organised according to a tree structure from a master key, characterised in that:
   a) the first user selects a leaf of the tree structure as an emitter account, said leaf being identified by a path in the tree, the emitter account being associated to a private key, $k_{leaf}$, a corresponding public key, $PK_{leaf}$, an emitter account address, $add_{leaf}$ obtained by hashing of the public key and a chain code, $CCK_{leaf}$;
   b) the first user encrypts said data by means of a secret key obtained from the chain code, $CCK_{leaf}$;
   c) the first user transmits a first transaction from his emitter account address $add_{leaf}$ to a smart contract deployed on the blockchain, the first transaction having as an argument the encrypted data as well as a call to a first function of the smart contract;
   d) the first function of the smart contract stores in the blockchain the encrypted data in connection with the emitter account address of the first user, $add_{leaf}$;
   e) the first user transmits to said smart contract, a second transaction from its emitter account address, $add_{leaf}$, the second transaction having as an argument the account address of the second user, an access token, as well as a call to a second function of the smart contract;
   f) the second function of the smart contract stores in the blockchain the access credit in connection with the pair formed by the emitter account address of the first user and the receiver account address of the second user;
   g) the second user transmits to said smart contract, a third transaction, from his receiver account address, the third transaction having as an argument the address of the emitter account of the first user as well as a call to a third function of the smart contract;
   h) the third function of the smart contract checks up that the access token stored in connection with the pair formed by the emitter account address of the first user and the receiver account address of the second user is valid and, in this case, returns to the receiver account address of the second user, the encrypted data stored in connection with the emitter account address of the first user, $add_{leaf}$.

2. The selective data disclosure method according to claim 1, characterised in that the first user transmits to the second user the address of the emitter account, $add_{leaf}$.

3. The selective data disclosure method according to claim 1, characterised in that the secret key is transmitted to the second user via a secure auxiliary channel.

4. The selective data disclosure method according to claim 3, characterised in that the secure auxiliary channel uses a NFC communication or an ultrasonic communication.

5. The selective data disclosure method according to claim 3, characterised in that after step (h), the second user decrypts the encrypted data with the secret key received beforehand via the secure auxiliary channel.

6. The selective data disclosure method according to claim 1, characterised in that the secret key is identical to the chain code, $CCK_{leaf}$.

7. The selective data disclosure method according to claim 1, characterised in that at step (c), the first user signs the first transaction with the private key $k_{leaf}$ and that at step (d), the first function of the smart contract checks up using this signature whether the first transaction has actually been emitted by the emitter account address of the first user, $add_{leaf}$, the encrypted data being store in the blockchain only if this check-up is positive.

8. The selective data disclosure method according to claim 1, characterised in that at step (e), the first user signs the second transaction with the private key $k_{leaf}$ and that at step (f), the second function of the smart contract checks up using this signature whether the second transaction has actually been emitted by the emitter account address of the first user, $add_{leaf}$, the access token being stored in the blockchain only if this check-up is positive.

9. The selective data disclosure method according to claim 1, characterised in that at step (g), the second user signs the third transaction with the private key associated to his receiver account and that at step (h), the third function of the smart contract checks up using this signature whether the third transaction has actually been emitted by the receiver account address of the second user, the encrypted data being made available to this address only if this check-up is positive.

10. The selective data disclosure method according to claim 1, characterised in that at step (h) the access token is invalidated by the third function of the smart contract after the encrypted data have been transmitted to the receiver account address of the second user.

11. The selective data disclosure method according to claim 1, characterised in that at step (c), the first transaction further comprises said path in the tree as an argument and that the latter is stored in the blockchain by the smart contract.

12. The selective data disclosure method according to claim 11, characterised in that at step (e), the second transaction further includes an index as an argument, the access token being stored at step (f) in connection with the pair of the emitter account of the first user and the receiver account of the second user, on the one hand, and of said index, on the other hand.

13. The selective data disclosure method according to claim 12, characterised in that at step (h), the third function of the smart contract checks up that the access token stored in connection, on the one hand, with the pair formed by the emitter account address of the first user and the receiver account address of the second user, and on the other hand, with said index, is actually valid and, if so is the case, said third function makes available to the address of the receiver account of the second user, the encrypted data stored in connection with the emitter account address of the first user, $add_{leaf}$ and said index.

* * * * *